(12) United States Patent
Robinson et al.

(10) Patent No.: US 7,368,409 B2
(45) Date of Patent: May 6, 2008

(54) REGENERATION METHOD OF HETEROGENEOUS CATALYSTS AND ADSORBENTS

(75) Inventors: James Robinson, Friendswood, TX (US); Nilanjan Brahma, League City, TX (US); Georges Mendakis, League City, TX (US); François Locatelli, Valence (FR); Pierre Dufresnce, Valence (FR)

(73) Assignee: Europeene de Retraitement de Catalyseurs-Eurecat, La Voulte Sur Rhone (FR)

( * ) Notice: Subject to any disclaimer, the term of this patent is extended or adjusted under 35 U.S.C. 154(b) by 92 days.

(21) Appl. No.: 10/434,365

(22) Filed: May 9, 2003

(65) Prior Publication Data
US 2004/0043890 A1  Mar. 4, 2004

Related U.S. Application Data

(63) Continuation of application No. 09/764,147, filed on Jan. 19, 2001, now abandoned.

(51) Int. Cl.
*B01J 20/34* (2006.01)

(52) U.S. Cl. .......................................................... 502/45
(58) Field of Classification Search .................. 502/41, 502/45, 53
See application file for complete search history.

(56) References Cited

U.S. PATENT DOCUMENTS

| 4,153,534 | A |   | 5/1979  | Vasalos |         |
|-----------|---|---|---------|---------|---------|
| 4,208,302 | A |   | 6/1980  | McKay   |         |
| 4,406,775 | A |   | 9/1983  | Bailor et al. |   |
| 5,358,630 | A |   | 10/1994 | Bertus et al. |   |
| 5,914,091 | A | * | 6/1999  | Holst et al. | 422/173 |

* cited by examiner

*Primary Examiner*—Edward M. Johnson
(74) *Attorney, Agent, or Firm*—Millen, White, Zelano, Branigan, P.C.

(57) ABSTRACT

A process for regenerating a palladium catalyst from a catalytic reaction where the catalyst is contaminated with at least carbon. The regenerating is conducted prior to any heating step under oxidizing conditions in the regenerating section. The regenerating involves at least one heating step under a hydrogen-containing reducing atmosphere and under conditions sufficient to lower the content of carbon in the palladium catalyst.

19 Claims, No Drawings

REGENERATION METHOD OF HETEROGENEOUS CATALYSTS AND ADSORBENTS

DESCRIPTION OF THE INVENTION

Process for the regeneration of a solid catalyst or of a solid adsorbent wherein the catalyst or the adsorbent is used in the form of a bed in a regeneration zone, in which bed the catalyst is in motion, said process comprising at least one heating step under a reductive atmosphere.

PRIOR ART

Heterogeneous catalysts and adsorbents are used in a number of applications in refining, petrochemicals and chemicals industries. They show their full performance at start of run, but after some time on stream usually deactivate more or less slowly depending on the application and the conditions of use. One reason of this activity loss is the formation of carbon deposits, typically called coke, restricting either the access or the nature of the active sites. A well-known countermeasure is the removal of these deposits by a controlled combustion, usually called regeneration. This operation can be performed either inside the reactor (in-situ method), either outside in a dedicated unit. For fixed bed units, this last method is more and more practiced for a number of reasons, as better temperature control leading to a higher activity recovery, time savings, environmental constraints. . . .

Another reason of deactivation of catalysts and adsorbents, especially those containing transition metals, is the poisoning of the metallic phase by various compounds brought during the run by the feedstock, one common poison being sulfur-containing molecules. Group VIII metals, either precious, as Platinum or Palladium, or not, as Nickel, are known to be deactivated by the adsorption of Sulfur.

The typical off-site regeneration techniques are based on a controlled combustion under diluted oxygen in various moving bed systems, either rotary furnaces such as Rotolouvres (U.S. Pat. No. 4,551,437 or U.S. Pat. No. 4,605,371), or belt furnaces and fluidized bed systems (EP-A-1002 581). One of the key elements of the process is to control oxygen partial pressure, which in turn governs the kinetics of carbon elimination and thus the heat release from the oxidation reactions. This operation of regeneration has often to be preceded of stripping step consisting of heating step, either under air or inert atmosphere (nitrogen or lean gas) in order to eliminate some free hydrocarbons contained in the catalyst porosity, just by promoting a phenomenon of evaporation.

INVENTION

It has now been discovered that this conventional technique could be significantly improved in a number of cases by adding a heating step under a hydrogen-containing atmosphere before an optional oxidative step. In some cases the hydrogen treatment alone can be sufficient to restore the catalyst or adsorbent activity. This process can be applied on any type of heterogeneous catalysts or adsorbents either made of an amorphous or crystalline material as for instance a zeolite.

This thermal treatment with an hydrogen containing gas can be associated with other treatment steps, such as oxygen containing gas treatment, or inert gas treatment, or solvent extraction for removal of leachable impurities or an association of these steps.

This step in the presence of hydrogen containing gas seems specifically useful for some metal containing catalysts, specifically when metals belong to Group VIII type, such as for instance Platinum, Palladium or Nickel.

The process applies also for some adsorbents, for instance Nickel containing adsorbents that are used for example as sulfur traps for purification of hydrocarbon feedstocks. After some time on stream they are more or less deactivated, meaning that their Sulfur adsorption capacity is greatly diminished. The new procedure according to this invention involving a treatment under hydrogen containing gas would be more efficient for restoring the adsorption capacity than a conventional regeneration with an oxidizing atmosphere.

In order to implement the process according to the present improvement, it is rather essential that during said process, the particles of the catalyst or of the adsorbent, i.e. the catalyst bed or the adsorbent bed, is in motion, said beds being selected for instance from the group consisting of mobile or moving beds, circulating beds, slurry beds, fluidized beds, expanded beds, ebullated beds or beds such as belt beds or rotary beds.

This treatment in a reductive atmosphere has proved to be superior to the conventional oxidative one step treatment. It is also better than a two step treatment consisting of Nitrogen followed by an Oxygen containing atmosphere. It appears that in some cases Hydrogen is more efficient than air for the removal of some types of carbon containing compounds, and also more efficient than Nitrogen. When the reductive treatment is not sufficient for removing all the carbonaceous species, then a subsequent oxidative treatment (conventional for instance) may be needed. In this case the residence time needed for completing carbon elimination is very much shortened compared to a direct oxidative treatment alone.

In the prior art, the oxidative treatment takes place at temperature between 300° C. and 700° C., and more typically between 400° C. Add 600° C. The stripping step under air or nitrogen may be performed in a wider range of temperatures, depending on the boiling points of hydrocarbons to be stripped, typically between 20° C. and 500° C.

This hydrogen treatment step according to the invention can also been practiced in the low range of temperatures, i.e. around 20-200° C. In this case the main phenomenon involved is mainly a stripping under a non oxidative atmosphere and the benefits of using Hydrogen instead of Nitrogen would be rather narrow. On the other hand, it has been found according to an improvement of the present invention that the use of higher temperatures such as 250 to 650° C. Add more specifically 300 to 550° C. brings a specific advantage.

APPLICATIONS

The benefits of the invention are probably most visible when the coke deposit has some aliphatic character, which is the case for instance if catalyst has been used in an application at rather low temperature under hydrogen pressure. One example where such conditions are used is the process of selective hydrogenation of olefinic cuts downstream a steam cracker. Catalysts used for these applications contain Palladium, alone or associated with a second metal (e.g. Silver or Gold), finely dispersed on a support, often alumina based. Typical catalysts for the C2 or C3 cut treatment contain a low Palladium amount (less than 0.1% weight). One side reaction is the so-called formation of green oil, these long chain oligomers being still often found in the porosity of these deactivated catalysts. The operation of regeneration will have to take place at moderate temperature, due to the intrinsic sensitivity of these materials. A conventional regeneration in oxidative conditions, either with or without nitrogen stripping, may produce in these low temperature conditions a product with some gray to black zones, so still containing some traces of carbon. On the other hand, a pretreatment with hydrogen will remove a large part of carbon and the subsequent oxidative step can thus be much easier.

Another case of application of this new regeneration method can be for the catalysts used in aromatics hydrogenation, for example benzene transformation to cyclohexane, or hydrogenation of various other heavier aromatics containing feedstocks. These catalysts are often containing a rather high amount of Nickel, typically 30 to 60 wt %.

Another case where the carbon deposit can have a somehow aliphatic character is encountered with shape selective zeolites used for various hydrocarbon transformations. Their internal porosity of channels and cavities of these crystallized aluminosilicates is small enough to limit the formation of polyaromatic rings by steric hindrance. One well-known case is the zeolite ZSM5 (or the approaching structure Silicalite) with a channel dimension around 5.5 Angstroms. So this method can also be used with profit for regeneration of aluminosilicates.

Another application of this invention is for the reactivation of the adsorbents called in the industry as Sulfur traps. In the refining or petrochemical industry, some catalysts extremely sensitive to sulfur need to be protected by a Sulfur guard bed. For instance, between a naphtha hydrotreater and the reformer or the isomerizer downstream, a "Sulfur Guard Bed" protects the Platinum containing catalysts loaded in these units. Its role is to remove sulfur compounds present in hydrotreated naphtha feedstock, as mercaptans, thiophene or hydrogen sulfide. These compounds are found at concentrations typically below 1 part per million in normal operation, and potentially higher during some upsets of the naphtha hydrotreating unit. Some sulfur guard beds are also installed in the chemical industry in order to protect hydrogenation catalysts containing either precious metals (Pt, Pd), nickel or copper chromites. In most cases, hydrogenation units consist of several reactors in series in which the first one usually plays the role of adsorbing sulfur compounds of the feedstock. Some nickel hydrogenation catalysts can be fully deactivated after adsorption of 1 wt % sulfur. The most common sulfur traps available on the market are nickel-based materials, with typically a Nickel content of 20 to 60 wt %. They exhibit a high sulfur adsorption capacity for $H_2S$ and mercaptans as well as a lower affinity for thiophenes.

The nickel containing traps, once contaminated with Sulfur has to be discarded. To the best of our knowledge, there is no technique allowing restoring the properties of a spent sulfur material. The conventional techniques of high temperature treatment either under nitrogen or under oxygen containing atmosphere are not able to restore the adsorption properties of these spent materials, even if a partial sulfur elimination can be observed. It has now been discovered that a heating step under a hydrogen-containing atmosphere could somehow restore the adsorption properties for Sulfur contaminated Nickel traps more efficiently than conventional techniques.

EXAMPLE 1 (COMPARATIVE)

A spent Nickel based material, used as a sulfur absorbent for light hydrocarbon feeds, was used to evaluate various regeneration routes. It contained about 52 wt % Nickel, the rest being silicon and aluminum oxide. Sulfur content is 17.2 wt %, measured by a LECO analyzer, and hydrocarbons content, measured by weight loss under Nitrogen up to 500° C. in a Setaram thermobalance is 5.7 wt %. Stripping of mentioned spent catalyst is performed under nitrogen at 500° C. in a laboratory rotating furnace setup. Catalyst feed-rate is 50 grams/hour with a residence time of 2 hours in the furnace hot zone and a flow rate of 500 liters/hour of nitrogen. After the treatment, the hydrocarbon analysis is below 0.5 wt % and Sulfur content is 17.6 wt %. This procedure does not reduce the sulfur but removes light hydrocarbon species.

The product is then submitted to an adsorption test using butyl mercaptan. This sulfur molecule is chosen as light naphtha feedstock typically contains mercaptans and thiophenes. The procedure is the following: 5 grams of catalyst are heated up to 180° C. and kept there for 4 hours, with a gas (10 liters/hour) containing 10 mol % of butyl mercaptan in nitrogen. After the test, the system is purged with nitrogen at 180° C. for 1 hour (2 liters/hour flow rate) and the sulfur content of the catalyst is analyzed. The sulfur uptake of this nitrogen stripped product in the mercaptan adsorption test is 6.1 wt %. This is about ⅓ of the capacity of a fresh material in these same conditions, and thus means that the material is not very attractive for reuse.

EXAMPLE 2 (COMPARATIVE)

The material of example 1 is further treated at 450° C. under air. The same laboratory rotating furnace setup as mentioned in example 1 is used. Catalyst feed-rate is 50 grams/hour with a residence time of 2 hours at a flow rate of 500 liters/hour of air. The sulfur content is reduced to 5.6 wt %. The sulfur uptake of this air regenerated product in the mercaptan adsorption test as mentioned is 0.2 wt %, which means that the material is virtually inactive.

EXAMPLE 3

The air-regenerated product as obtained in example 2 is subsequently activated under hydrogen at 450° C. The same laboratory rotating furnace setup as mentioned in example 1 is used. Catalyst feed-rate was about 50 grams/hour with a residence time of 2 hours at a flow rate of 500 liters/hour of hydrogen. Sulfur content remains virtually unchanged at 5.3 wt %. The Sulfur uptake of this activated material in the mercaptan adsorption test is 13.8 wt %, which means that the material may be qualified for a potential re-use in an industrial unit.

EXAMPLE 4

The air-regenerated product as obtained in example 2 is subsequently activated under hydrogen at 600° C., all conditions being the same as described in example 3 except temperature. Sulfur content decreases to 3.3 wt %. The Sulfur uptake in the mercaptan adsorption test is 15.6 wt %. Product is still better than in example 3 and is thus improved by the high temperature treatment.

EXAMPLE 5

The raw material as mentioned in example 1 is treated directly under hydrogen at 600° C. The same laboratory rotating furnace setup as mentioned in example 1 is used. Catalyst feed-rate is about 50 grams/hour with a residence time of 2 hours at a flow rate of 2 liters/hour of hydrogen.

Sulfur content is reduced to 2.9 wt %. The Sulfur uptake of this material in the mercaptan adsorption test is 16.3 wt %, meaning that it may be qualified for a potential re-use in an industrial unit.

EXAMPLE 6 (COMPARATIVE)

Around 1 kg of spent catalyst applied for selective hydrogenation of ethylene cut from steam cracking is used. It contains a low amount of Palladium, less than 0.1 wt % supported on alumina. Carbon content from the LECO analyzer is 4.7 wt %. It is treated according to a two-step process. Stripping of mentioned spent catalyst is performed under Nitrogen at 450° C. in a laboratory rotating furnace setup. Catalyst feed-rate is 50 grams/hour with a residence time of 2 hours in the furnace hot zone and a flow rate of 500 liters/hour of nitrogen. At this point, Carbon content is 1.2 wt %. Then the oxidative regeneration step is performed in the same conditions replacing nitrogen by dry air at a temperature of 450° C. At the end of the treatment, carbon content is 0.1 wt % but the product still shows some black and gray shadows.

EXAMPLE 7

The raw material as used for example 6 is treated first by Hydrogen at 450° C. in the laboratory rotating furnace setup. Catalyst feed-rate is 50 grams/hour with a residence time of 2 hours and a flow rate of 500 liters/hour of hydrogen. Carbon content is 0.5 wt %. Then the oxidative regeneration step is performed in the same conditions replacing Hydrogen by dry air at a temperature of 450° C. At the end of the treatment, carbon content is 0.1 wt % and the product is homogeneously light gray.

EXAMPLE 8

The raw material used for example 6 is leached first by a solvent in order to remove some light hydrocarbons. Around 300 g of this spent catalyst are placed in a beaker, covered with 600 ml of white spirit and left 1 hour at 80° C. Add filtered. The wet catalyst is then treated by Hydrogen at 450° C. in the laboratory rotating furnace setup. (50 grams/hour in weight of dry product, residence time 2 hours, 500 liters/hour of hydrogen. Carbon content is 0.3 wt % after the leaching and the Hydrogen steps. Then the oxidative regeneration step is performed in the same conditions replacing hydrogen by dry air at a temperature of 450° C. At the end of the treatment, carbon content is 0.1 wt % and the product is homogeneously light gray.

EXAMPLE 9

An activity test is performed to qualify the performance of both products of examples 6 and 7 in selective acetylene removal of a mixed ethylene cut. The feedstock has the following composition (expressed in % volume): Hydrogen 26.6; Ethylene 42.3; Methane 30.8%; Acetylene 0.26; Carbon monoxide 0.032. The test starts at 38° C. Add temperature increases at 2.5° C./min. The so-called cleanup temperature $T_{cu}$ is determined when the acetylene composition goes down to 20 ppm. Then at increasing temperature ethylene gets more and more hydrogenated and runaway can be reached. $T_{ra}$ is noted for a 3% volume ethylene conversion. Then, temperature is decreased back to 38° C. Add then procedure is repeated. A new couple of temperatures $T'_{cu}$ and $T'_{ra}$ is determined. The difference $T'_{ra}-T'_{cu}$ is defined as the operating window. The best catalyst has the lowest cleanup temperature and the largest operating window. The product of example 6 regenerated according to a prior art procedure has a cleanup temperature of 50.0° C. Add an operating window of 22.2° C. The product of the example 7 regenerated according to the invention has a cleanup temperature of 48.5° C. Add an operating window of 24.9° C.

EXAMPLE 10 (COMPARATIVE)

A spent massive nickel containing catalyst, used in an application of aromatic hydrogenation, is also used to compare the conventional regeneration with the new method. It contained about 52 wt % Nickel, the rest being alumino silicate support. It is contaminated with 0.9 wt % sulfur and 6.7 wt % carbon. Regeneration of mentioned spent catalyst is performed under air at 300° C. in a laboratory rotating furnace setup. Catalyst feed-rate is set at 50 grams/hour with a residence time of 2 hours in the hot part of the furnace and airflow is 500 liters/hour. The product is then fed again under air at 450° C. to the same rotating furnace set up in the same condition. The residual sulfur content of the regenerated product is 0.6 wt % while the carbon content is reduced to 0.6 wt %. A representative sample of the product is collected, grinded and sieved between 16 and 25 ASTM sieve.

A 0.5 g sample is submitted to a benzene hydrogenation test. Sample is mixed with inert alumina of same granulometry and loaded in the basket of an autoclave from Autoclaves Engineer. Reactor is closed, purged with nitrogen for 0.5 hour. A hydrogen flow of 1 liter/h is applied and reactor is heated up to 400° C. for 4 hours with the objective of achieving a reduced state. Reactor is then allowed to cool down under Nitrogen flow to ambient temperature. At this point 50 ml of a mixture 80/20 of cyclohexane/benzene is added through a calibrated pump, and catalyst temperature adjusted to 100° C. Reactor pressure is adjusted and regulated to 1 Mpa. A gas dosage system operating at 3 Mpa of Hydrogen is connected to the reactor and the pressure of this gas burette is monitored through a pressure transducer and recorded with time. The activity result is expressed by the rate constant of hydrogen consumption kinetics. Result is found for this regenerated catalyst at $12.1 \ 10^{-3} \ s^{-1}$.

EXAMPLE 11 (COMPARATIVE)

The spent catalyst as used in example 10 is regenerated under air in two steps in the laboratory rotating furnace in the same conditions as in example 10, except temperature: first step still at 300° C., and then second step at 550° C. The residual sulfur and carbon contents of the regenerated product are respectively 0.4 and 0.1 wt %. A representative sample of the product is collected and submitted to a benzene hydrogenation test as described in Example 10. The same procedure is used including the in-situ reduction step at 400° C. Activity is measured at $10.9 \ 10^{-3} \ s^{-1}$. No improvement is noted with the higher temperature despite the reduction in C and S levels.

EXAMPLE 12

The spent catalyst as used in example 11 is regenerated under hydrogen in one step in the laboratory rotating furnace at a temperature of 450° C. Catalyst feed-rate is set at 50 grams/hour with a residence time of 2 hours and hydrogen flow is 500 liters/hour. The residual sulfur content of the regenerated product is lowered at 0.7 wt % while the carbon content is reduced to 1.8 wt %. A representative sample of the product is collected and submitted to a benzene hydrogenation test as described in Example 10. The same procedure is used including the in-situ reduction at 400° C. Activity is measured at 14.7 $10^{-3}$ $s^{-1}$.

EXAMPLE 13

The spent catalyst as used in example 11 is regenerated under hydrogen in one step in the laboratory rotating furnace at a temperature of 550° C. All other conditions are the same than example 12. The residual sulfur content of the regenerated product is lowered at 0.3 wt % while the carbon content is reduced to 1.2 wt %. A representative sample of the product is collected and submitted to a benzene hydrogenation test as described in Example 10. The same procedure is used including the in-situ step reduction at 400° C. Activity is measured at 16.3 $10^{-3}$ $s^{-1}$.

The invention claimed is:

1. A process comprising:
   a) obtaining a palladium catalyst contaminated with at least long chain oligomers from a catalytic selective hydrogenation of olefinic cuts in a catalytic reaction section, and
   b) in an off-site regenerating section, regenerating a bed of said palladium catalyst contaminated with at least long chain oligomers by directly conducting a heating step under a hydrogen-containing reducing atmosphere and under conditions sufficient to lower the content of long chain oligomers in said palladium catalyst, said bed of said palladium catalyst contaminated with at least long chain oligomers being a belt bed or a rotary bed.

2. A process according to claim 1, wherein the regenerating is conducted in by said heating step under a hydrogen-containing reducing atmosphere alone.

3. A process according to claim 1, wherein the heating step under a hydrogen-containing reducing atmosphere is at a temperature of 20-200° C.

4. A process according to claim 1, wherein the heating step under a hydrogen-containing reducing atmosphere is at a temperature of 250-650° C.

5. A process according to claim 1, wherein the heating step under a hydrogen-containing reducing atmosphere is at a temperature of 300-550° C.

6. A process according to claim 1, wherein the palladium catalyst contains palladium associated with another metal.

7. A process according to claim 6, wherein the palladium and other metal are finely dispersed on a support.

8. A process according to claim 7, wherein the support is an alumina support.

9. A process according to claim 1, wherein the palladium catalyst contains less than 0.1% weight of palladium.

10. A process according to claim 1, further comprising an oxidative treatment for regeneration subsequent to the heating step under a hydrogen-containing reducing atmosphere.

11. A process for the off-site regeneration of a catalyst or adsorbent selected from:
   a deactivated catalyst containing palladium contaminated at least with long chain oligomers,
   a deactivated catalyst containing nickel from an aromatics hydrogenation contaminated at least with carbonaceous deposits, or
   a nickel-containing solid adsorbent contaminated with sulfur, which process comprises:
   a) obtaining said catalyst or adsorbent, and
   b) in a regenerating section, regenerating a bed of said catalyst or adsorbent by directly conducting a heating step under a hydrogen-containing reducing atmosphere and under conditions sufficient to lower the content of at least one contaminant in said catalyst or adsorbent, said bed of said catalyst or adsorbent being a belt bed or a rotary bed.

12. The process of claim 11, wherein the catalyst or adsorbent is a deactivated catalyst containing palladium finely dispersed on a support contaminated at least with long chain oligomers due to its use in a selective hydrogenation of olefinic cuts downstream of a steam cracker.

13. The process of claim 11, further comprising, after the heating step under a hydrogen-containing reducing atmosphere, an oxidative treatment for regenerating the catalyst or adsorbent.

14. The process of claim 12, further comprising, after the heating step under a hydrogen-containing reducing atmosphere, a subsequent oxidative treatment for regenerating the catalyst.

15. The process of claim 11, wherein the catalyst or adsorbent contains an amorphous or zeolitic support.

16. The process of claim 12, wherein the catalyst contains an amorphous or zeolitic support.

17. The process of claim 11, wherein catalyst or adsorbent is a nickel-containing solid adsorbent contaminated with sulfur, and the regenerating step consists only of the one heating step under a hydrogen atmosphere.

18. The process of claim 11, wherein catalyst or adsorbent is a deactivated catalyst containing nickel from an aromatics hydrogenation contaminated at least with carbonaceous deposits, and the regenerating step consists only of the one heating step under a hydrogen atmosphere.

19. The process of claim 14, wherein the at least one heating step is conducted under a hydrogen atmosphere and the subsequent oxidative treatment is carried out by replacing the hydrogen atmosphere with a dry air atmosphere.

* * * * *